United States Patent [19]

Arai

[11] Patent Number: 5,083,205
[45] Date of Patent: Jan. 21, 1992

[54] TELEVISION RECEIVER WITH MEMORY RECALL OF TELEVISION BROADCAST CHANNEL AND SYSTEM

[75] Inventor: Tsutomu Arai, Chiba, Japan
[73] Assignee: Sony Corporation, Tokyo, Japan
[21] Appl. No.: 549,827
[22] Filed: Jul. 9, 1990

[30] Foreign Application Priority Data

Jul. 18, 1989 [JP] Japan .................................. 1-185082

[51] Int. Cl.⁵ ...................... H04N 5/262; H04N 5/62; H04N 5/72
[52] U.S. Cl. .................................. 358/140; 358/183; 358/191.1
[58] Field of Search ............... 358/183, 190, 198, 197, 358/191.1, 11

[56] References Cited

U.S. PATENT DOCUMENTS

| | | | |
|---|---|---|---|
| 4,405,946 | 9/1983 | Knight | 358/183 |
| 4,746,983 | 5/1988 | Hakamada | 358/183 |
| 4,914,523 | 4/1990 | Maruta | 358/11 |
| 4,920,416 | 4/1990 | Motoyama | 358/198 |
| 4,933,749 | 6/1990 | Van Lammeren | 358/11 |

FOREIGN PATENT DOCUMENTS

0639373 1/1988 Japan.

*Primary Examiner*—James J. Groody
*Assistant Examiner*—Glenton B. Burgess
*Attorney, Agent, or Firm*—Alvin Sinderbrand; William S. Frommer

[57] ABSTRACT

Television receiving apparatus for receiving television signals broadcasted over preselected broadcast channels by different television broadcast systems. Plural demodulators demodulate and concurrently display television programs broadcasted by different television broadcast systems. A processor selects a broadcast channel to be demodulated by at least one of the demodulators; and a detector detects if television signals are broadcasted over the selected channel. If so, the sound carrier frequency derived from the broadcasted television signal is determined and the television broadcast system is identified as a function of that carrier frequency. A memory stores an indication of the selected broadcast channel and the identify of the television broadcast system which uses that channel; whereafter the processor is advanced to select yet another channel and to identify the television broadcast system by which television signals are broadcasted over that other channel. As this process continues, the memory stores indications of channels which can be received and identities of the television broadcast systems which use those channels. Subsequently, desired broadcast channels together with the identities of the television broadcast systems which use those channels may be retrieved from the memory to configure the respective demodulators in a manner compatible with those television broadcast systems to enable the television programs which are broadcasted over the retrieved channels to be demodulated and concurrently displayed, such as in a picture-in-picture format.

20 Claims, 5 Drawing Sheets

TELEVISION RECEIVER WITH MEMORY RECALL OF TELEVISION BROADCAST CHANNEL AND SYSTEM

BACKGROUND OF THE INVENTION

1. Field of the Invention

This invention relates to television receiving apparatus having a picture-in-picture function and, more particularly, to such apparatus which is capable of receiving and concurrently displaying television programs that are broadcasted over different television channels by different television broadcast systems (such as television programs broadcasted over M, B/G, I, K or L systems).

2. Description of the Prior Art

Different television standards have arisen in different countries, particularly in the United States, Europe and Japan. Consequently, television receiving apparatus destined for a particular country must, of course, be compatible with the television standards adopted in that country. In most instances, because of the relatively limited range over which a broadcasted television signal may be received, and because generally uniform standards have been adopted in different geographic regions around the globe, the fact that different countries may broadcast television programs in accordance with different television standards does not present a serious problem. For example, one standard is used in North America (primarily the United States, Canada and Mexico), another standard is used in England, yet another standard is used in Western Europe, a further standard is used in France and a still other standard is used in Eastern Europe. For the most part, substantially the same standard has been adopted in Japan as is used in North America.

Television standards are based upon particular parameters of a typical television signal. For example, two basic standards have been developed around the world based upon the number of horizontal lines that are included in a video frame and the number of fields that are transmitted per second (i.e. the vertical frequency). These two broad standards are known as the 525/60 system, which is used primarily in North America and in Japan, and the 625/50 system, which is used primarily throughout Europe. Another parameter associated with particular television standards is the separation between the carrier frequency onto which the video information is modulated and the carrier frequency onto which the audio information is modulated. This channel separation between the video and audio broadcast frequencies is reflected in the difference between the video intermediate frequency and the audio intermediate frequency which are generated when a television program is received. This video/audio channel separation ranges from about 4.5 MHz in North America to about 6.5 MHz in Eastern Europe and in France.

Yet another parameter that is basic to a television standard is the manner in which color information is multiplexed for transmission. Typical of the color standards are the NTSC, PAL and SECAM standards. Normally, demodulating circuitry that is used to recover color information multiplexed in accordance with one standard is not readily usable to demodulate color information that has been multiplexed in accordance with a different standard.

A still further parameter that differs from one television standard to another is the specific intermediate frequency $f_p$ to which the broadcasted video signal is converted. As is known to those of ordinary skill in the art, although the broadcast frequency may change from one channel to the next (for example, in the United States there are twelve VHF frequencies and seventy UHF frequencies which comprise 82 broadcast channels), regardless of the particular channel to which a television receiver is tuned, only one video intermediate frequency is generated. This video IF frequency $f_p$ varies from, for example, 58.75 MHz in Japan to 45.75 MHz in the United States to 39.5 MHz in England.

There are primarily six different television standards used throughout the world. These standards have become known as the B, G, I, K, L and M standards; and the M standard is used in North America and Japan, with certain parameters of the M standard used in Japan being different from those parameters used in the United States, such as the video IF frequency mentioned above. For convenience, these standards are summarized in Table 1 as follows:

TABLE 1

| | TV Standard (television broadcast system) | | | | | |
|---|---|---|---|---|---|---|
| | B | G | I | K | L | M |
| Number of scanning lines | 625 | 625 | 625 | 625 | 625 | 525 |
| Vertical frequency (Hz) | 50 | 50 | 50 | 50 | 50 | 60 |
| fs–fp (MHz) | +5.5 | +5.5 | +6 | +6.5 | +6.5 | +4.5 |
| Difference between fp and adjacent channel (MHz) | −1.25 | −1.25 | −1.25 | −1.25 | −1.25 | −1.25 |
| Channel band width (MHz) | 7 | 8 | 8 | 8 | 8 | 6 |
| Audio modulation system | FM | FM | FM | FM | AM | FM |
| Popular name of system | West European system | West European system | U.K. system | East European system | French system | American system |

As used throughout this specification, the expression "television broadcast system" means the particular television standard which is used to create television signals that are broadcasted over a preselected broadcast channel.

Television signals are broadcasted in accordance with a single type of television broadcast system in a particular region, such as in Japan or in North America, and since the source of a different type of television broadcast system is so distant (e.g. Europe), it is highly unlikely, if not impossible, for a television receiver in the particular region to receive television signals broadcasted in accordance with a different system (such as from Europe). Thus, it is highly unlikely for a television receiver in the United States (which receives television signals in accordance with the M standard) to receive television signals broadcasted in accordance with the B, G, I, K or L standard. However, in Europe where heterogeneous television broadcast systems exist, it is likely that a television receiver in one country, such as in Germany, may receive television signals broadcasted by different television broadcast systems (as may emanate from France or Eastern Europe). That is, it is likely that such a television receiver may be able to pick up television signals broadcasted over different channels by B, G, K or L standards. Normally, the same broadcast frequency, or channel, is not used by two or more broadcasting stations that are sufficiently proximate to be picked up by one television receiver, as this would result in interference.

Rather than provide different television sets, each compatible with a respective television broadcast system, for use in those areas that are able to receive television signals broadcasted by different systems, it is desirable to provide a single television receiver having multiple standard capabilities. For example, it is desirable to manufacture a television receiver for use in Germany that is capable of receiving and displaying television programs broadcasted in accordance with B, G, K or L systems. Such a television receiver has been proposed, wherein different bandpass filters, trap filters and IF circuit operating characteristics, all consistent with different respective television broadcast systems, may be selected by the user. Of course, for proper selection of these filters and operating characteristics (referred to generally as demodulating parameters), the user should be provided with an indication of the type of television broadcast system that is being used to broadcast a television program over a particular broadcast channel.

Still further, with the recent introduction of television receivers having the so-called picture-in-picture function, it is desirable to display one picture of one television program broadcasted in accordance with one type of television broadcast system and simultaneously display, on the same display screen, yet another picture of another television program broadcasted in accordance with a different type of television broadcast system.

In picture-in-picture television receivers capable of receiving television programs broadcasted in accordance with different television broadcast systems, as proposed heretofore, identical television broadcast system identifying circuitry is provided in each demodulator that is used to produce a respective one of the "picture-in-picture" pictures. This results in a relatively expensive television receiver having complicated wiring and resulting in a device of relatively large size. Furthermore, identification of a particular type of television broadcast system being used to transmit the received television signals generally is dependent upon detecting the difference between the video and audio IF frequencies (Table 1 indicates that detection of this IF frequency difference provides a relatively accurate identification of the type of television broadcast system being used). However, when the broadcast channel to which one (or more) of the demodulators is tuned is changed, there is a substantial delay before the video and audio IF frequencies of that new channel are identified. Consequently, there is a delay in identifying the type of television broadcast system being used to transmit the television signals over this new channel and, as a result, a display of the corresponding video picture is delayed. The resultant blanking of the display screen is undesired and annoying.

OBJECTS AND SUMMARY OF THE INVENTION

Therefore, it is an object of the present invention to provide improved television receiver apparatus having a picture-in-picture function which avoids the aforementioned drawbacks and disadvantages associated with prior art television receivers.

Another object of this invention is to provide improved television receiving apparatus capable of receiving and displaying television programs broadcasted over different channels by different television broadcast systems.

A further object of this invention is to provide television receiving apparatus of the aforementioned type wherein two or more television pictures are displayed simultaneously in picture-in-picture format, even though the different television pictures are derived from television programs broadcasted by different television broadcast systems.

An additional object of this invention is to provide television receiving apparatus for receiving and displaying concurrently television programs broadcasted by different television broadcast systems wherein a single system identifying circuit is provided for plural television signal demodulators.

Yet another object of this invention is to provide improved television receiving apparatus of the aforementioned type which is of relatively simple construction, less expensive to manufacture and exhibits an overall smaller size.

A still further object of this invention is to provide television receiving apparatus of the aforementioned type having plural demodulators adapted to demodulate and display simultaneously different television pictures derived from different television broadcast systems and wherein the particular broadcast channel to which one or more of the demodulators is/are tuned may be changed without producing a significant delay in displaying the television picture derived from the new channel.

Still another object of this invention is to provide picture-in-picture television receiving apparatus of the aforementioned type wherein the broadcast channel to which the demodulator is tuned may be changed to a new channel and the television broadcast system by which television signals are broadcast over that new channel may be identified quickly and without noticeable delay.

Still an additional object of this invention is to provide improved television receiving apparatus which can be used to receive television signals broadcast in accordance with different television standards.

Various other objects, advantages and features of the present invention will become readily apparent from the ensuing detailed description, and the novel features will be particularly pointed out in the appended claims.

In accordance with this invention, television receiving apparatus is provided for receiving television signals broadcasted over preselected broadcast channels by different television broadcast systems.

The apparatus includes plural demodulators for concurrently demodulating and displaying television programs broadcasted by different television broadcast systems. For example, different programs transmitted over different channels by the same or different television broadcast systems may be displayed in a picture-in-picture format. A processor selects a broadcast channel to be demodulated by at least one of the demodulators and, if television signals are being broadcast over that channel, the processor identifies the television broadcast system used by that channel to broadcast the television signals. A memory stores an indication of the selected broadcast channel and the identity of the television broadcast system associated with that channel. Then, the processor is advanced to select another channel for the purpose of storing a channel indication and television broadcast system identity if television signals are broadcast over that other channel. As a result, a table of broadcast channels and associated television broadcast systems is stored; and channel indications and associated television broadcast system identities may be retrieved from the memory and supplied to the demodulators for demodulating and concurrently displaying television programs broadcasted over the retrieved channels.

As one aspect of this invention, when television signals are broadcast over a selected broadcast channel, the audio carrier frequency of the television signals broadcasted over that channel is determined. The television broadcast system is identified as a function of the sound carrier frequency derived from the broadcasted television signals and, in a preferred embodiment, the television broadcast system is identified as a function of $f_s - f_p$, wherein $f_s$ is the audio carrier frequency and $f_p$ is the video carrier frequency. In a preferred embodiment, $f_s$ is the audio IF frequency and $f_p$ is the video IF frequency derived from the received television signals.

As an aspect of this invention, each demodulator includes a tuner tunable to a broadcast channel selected by the processor. Preferably, each demodulator also includes an IF circuit coupled to the tuner for producing video IF signals from the television signals broadcast over the channel to which the tuner is tuned. A determination of whether television signals are being broadcasted over a particular channel is made as a function of the level of the video IF signals produced by the IF circuit.

Each demodulator also includes audio IF circuitry for producing sound IF signals from the television signals which are broadcasted over the channel to which the tuner is tuned. A determination of the sound carrier frequency is made as a function of the sound IF signal level.

As another aspect of this invention, each demodulator includes plural bandpass filters, each individually connectable between the tuner and the IF circuit and each being tuned to a frequency established by a respective television broadcast system. The reception of television signals is detected by selecting a particular filter for connection between the tuner and the IF circuit as a function of the broadcast channel which is selected by the processor. Thus, depending upon the selected broadcast channel, $f_p$ is established.

As yet another aspect of this invention, each demodulator includes plural audio bandpass filters each individually connectable to the sound IF circuit and each being tuned to a respective sound IF frequency. The sound carrier frequency of the received television signals is determined by sequentially connecting the audio bandpass filters to the sound IF circuit and selecting the one audio bandpass filter which results in the sound IF signal having the largest level. As a result, $f_s - f_p$ is determined.

As an alternative, the reception of the television signals over a selected broadcast channel is detected by sequentially connecting individual filters, each tuned to a frequency $f_p$, between the tuner and the IF circuit and selecting the particular filter (and, thus, $f_p$) which results in the one video IF signal having the largest level. Then, the sound IF frequency is determined, such as described above.

As another feature of this invention, after channel indications and television broadcast system identities are stored in the memory, any desired channel may be read out to select a broadcast channel to be received by the apparatus; and the associated television broadcast system identity likewise is read out and used to set the parameters of a demodulator to enable the television signals broadcasted over that selected channel to be demodulated and displayed.

As a feature of this aspect of the invention, different broadcast channel indications (and associated television broadcast system identities) may be read from the memory and used to configure different demodulators to receive television signals broadcasted over different channels simultaneously. Different television pictures may be superimposed on the same display screen by using the picture-in-picture function of the apparatus.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF A PREFERRED EMBODIMENT

Figure 1A:
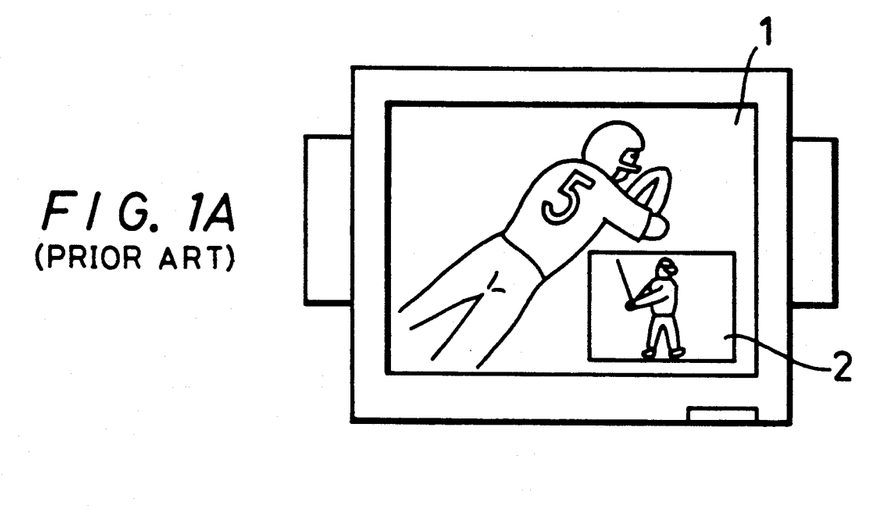
FIGS. 1A and 1B are schematic representations of the picture-in-picture display feature which may be used by the present invention.
Figure 1B:
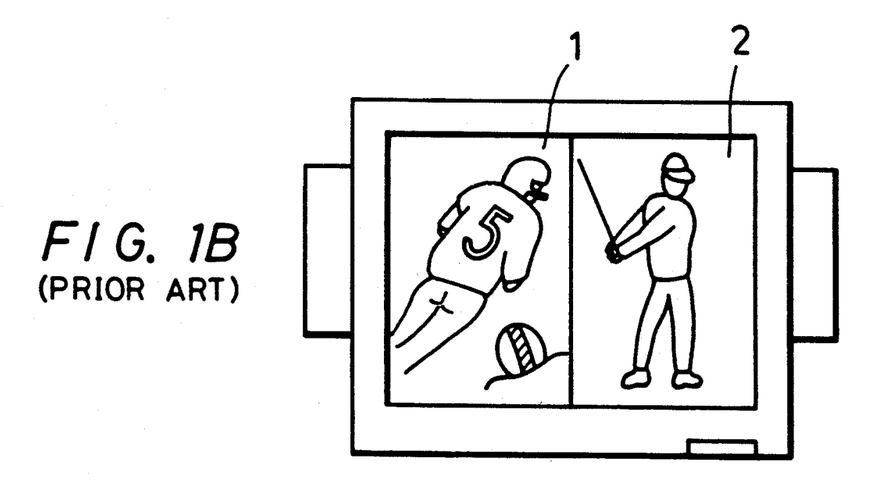

Before describing the features and advantages of the present invention, reference is made to FIGS. 1A and 1B which are schematic illustrations of the picture-in-picture display format that can be used with the present invention. As is familiar to those having experience with television receiving apparatus exhibiting this picture-in-picture capability, a sub-picture 2 may be displayed as an inset in a main or primary picture 1 as both television pictures are displayed simultaneously on the same display screen of a television receiver, as shown in FIG. 1A. Typically, television receiving apparatus capable of providing a picture-in-picture display includes two demodulators, referred to as demodulators A and B. These two demodulators are of substantially similar construction and each includes a tuner independently tunable to a desired broadcast channel. The demodulators also include demodulating, detecting and processing circuitry to generate the video pictures shown in FIG. 1A. Preferably, primary picture 1 and inset picture 2 may be reversed such that the television program which produces the inset picture may be displayed as the primary picture and vice-versa.

FIG. 1B illustrates an alterative picture-in-picture display of primary picture 1 and inset picture 2. In this alternative display, the two pictures may be of substantially the same size, each occupying approximately half the display screen. In both the FIG. 1A and FIG. 1B embodiments, the audio information which accompanies the television program from which the primary picture is displayed is reproduced. In some receiving apparatus an audio selector switch is provided to enable the user to select for sound reproduction the audio information which accompanies either the primary picture or the inset picture.

Figure 2A:
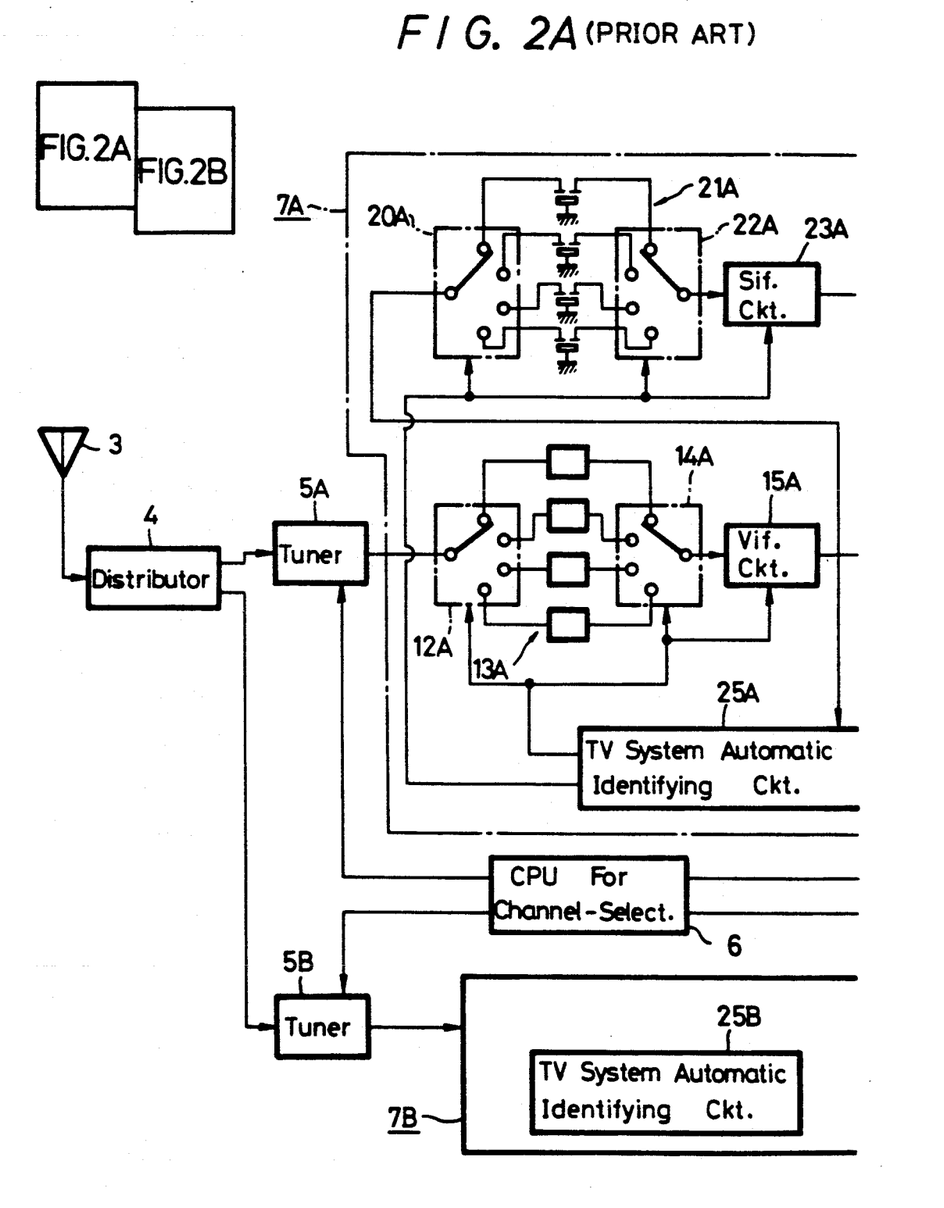
FIGS. 2A and 2B, in combination, comprise a block diagram representing television receiving apparatus proposed heretofore for receiving television signals broadcast by different television broadcast systems.
Figure 2B:
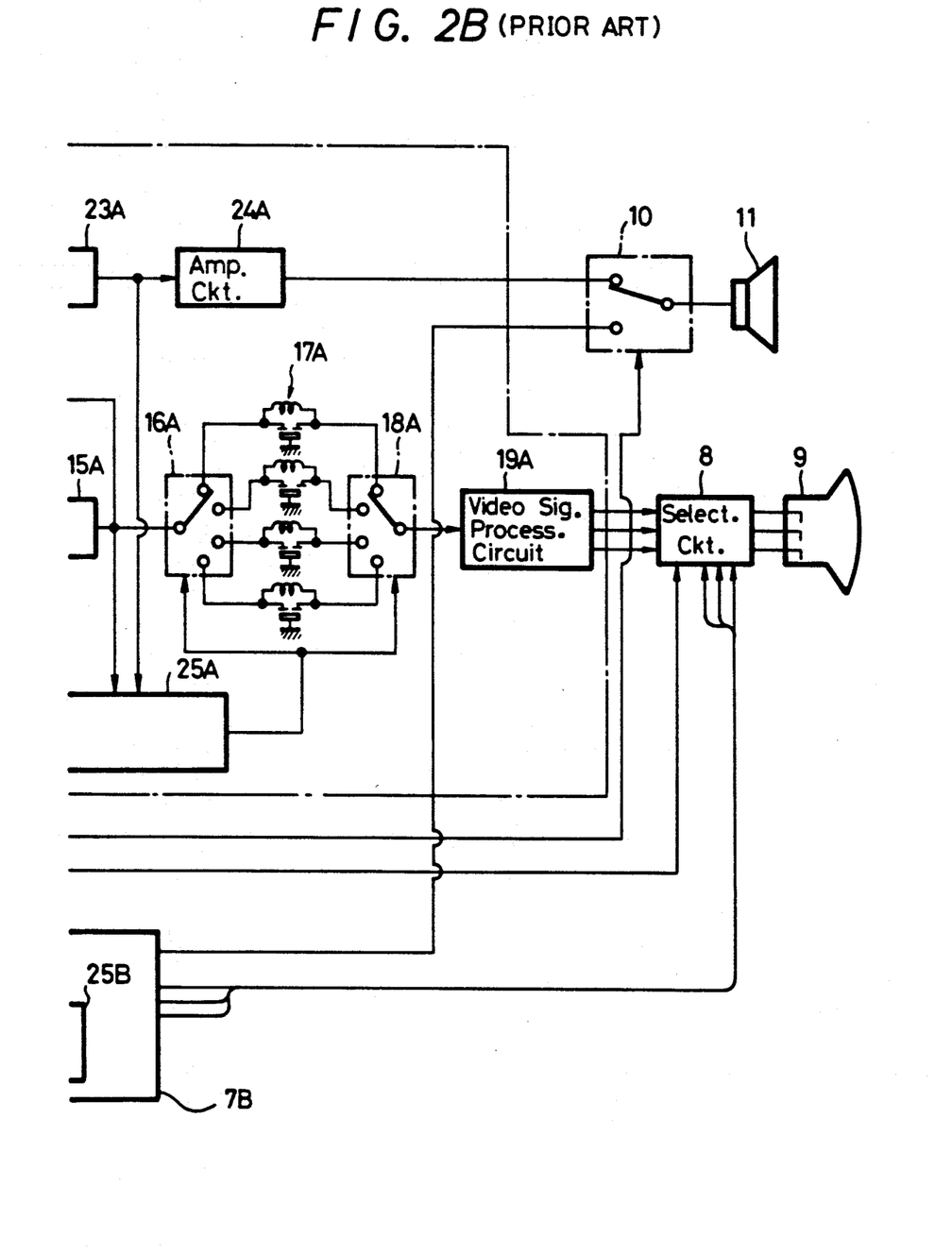

Turning now to FIGS. 2A and 2B, a block diagram representing television receiving apparatus proposed heretofore for receiving television signals broadcast simultaneously over two different channels by two different television broadcast systems is illustrated. The apparatus is comprised of a distributor 4, and two demodulators, designated A and B, each including a tuner 5 and a signal processing circuit 7 (referred to as a signal processor). The apparatus also includes a central processing unit (CPU) 6, a video selecting circuit 8, a picture tube 9, an audio selector switch 10 and an audio transducer, such as a loudspeaker 11. Distributor 4 is coupled to an antenna 3 to receive television signals which are broadcast by, for example, over-the-air transmission. Distributor 4 is coupled to tuners 5A and 5B and is adapted to supply the broadcast television signals to each of these tuners. Tuners 5A and 5B are coupled to CPU 6 and are adapted to receive channel selection signals from the CPU. For example, each tuner may include a frequency synthesizer adapted to generate a tuning frequency in response to a control signal supplied from CPU 6. Such electronic tuning devices are known, and in the interest of brevity, further description thereof is not provided herein.

Tuner 5A is coupled to signal processor 7A and, similarly, tuner 5B is coupled to signal processor 7B. The signal processors are substantially identical and, in the interest of brevity, only processor 7A is illustrated in detail and described.

Signal processor 7A includes an intermediate frequency circuit 15A to produce video IF signals and, for convenience, this video IF circuit is referred to as a VIF circuit. VIF circuit 15A is coupled to tuner 5A by a selected one of bandpass filters 13A. Preferably, these bandpass filters are formed as surface acoustic wave (SAW) filters, and each is tuned to a particular video intermediate frequency used by a respective television broadcast system. For example, one of the IF frequencies to which an SAW filter is tuned is on the order of 58.75 MHz, the IF frequency adopted by the M system in Japan. Another SAW filter is tuned to 45.75 MHz, the IF frequency adopted by the M system in the United States. Yet another filter is tuned to 39.5 MHz, the IF frequency adopted by the I system. Other SAW filters are tuned to other frequencies; and although four SAW filters are illustrated in FIG. 2A, it will be appreciated that there may be as many filters as there are different standard IF frequencies. Switches 12A and 14A are controlled by a television system identifying circuit 25A, to be described, for connecting a selected one of the SAW bandpass filters between tuner 5A and VIF circuit 15A. It is appreciated that, depending upon the particular television broadcast system by which television signals are broadcasted to the illustrated apparatus, the selection of a particular one of the SAW bandpass filters will produce an optimum VIF signal at the output of VIF circuit 15A. This circuit also is coupled to identifying circuit 25A and is adapted to have its characteristics modified in response to a control signal supplied by the identifying circuit so as to enhance the video IF signal produced thereby.

The output of VIF circuit 15A is coupled to a video signal processor 19A by way of an array of trap filters 17A. As is known, both audio IF signals and video IF signals are present at the output of the VIF circuit. The audio IF signals are separately processed to recover audio information transmitted with the television signals, as will be described. The video information included in the video IF signals are processed by a video signal processing circuit 19A from which luminance and chrominance components are recovered and supplied to video selector circuit 8 for display on picture tube 9. Trap filters 17A serve to substantially eliminate the audio IF components and adjacent channel components included at the output of the VIF circuit 15A and, thus, block these components from the video signal processing circuit. Trap filters 17A comprise an array of trap circuits, each tuned to, for example, the audio IF frequency and/or adjacent channel frequencies of a particular television broadcast system. Switching circuits 16A and 18A are controlled by identifying circuit 25A to connect one of these trap filters between the output of VIF circuit 15A and the input of video signal processing circuit 19A.

The output of VIF circuit 15A is coupled to a sound intermediate frequency circuit 23A, referred to as an SIF circuit. SIF circuit 23A is adapted to recover the audio signals which had been broadcasted as part of the television signals. An array of bandpass filters 21A is provided to pass the sound IF signal and block the video IF signal provided at the output of VIF circuit 15A. Each of these audio bandpass filters included in array 21A is tuned to the sound IF frequency of a particular television broadcast system. For example, in the M system used in the United States, the video and audio IF signals produced at the output of VIF circuit 15A inherently "beat" together to produce a difference frequency $(f_s - f_p)$ equal to 4.5 MHz, wherein $f_p$ is the video intermediate frequency and $f_s$ is the audio intermediate frequency. The sound IF signal supplied to SIF circuit 23A exhibits this 4.5 MHz carrier frequency. Accordingly, one of the audio bandpass filters included in array 21A is tuned to this difference frequency of 4.5 MHz and exhibits a passband sufficient to block the video IF signal from being supplied therethrough to the SIF circuit. In similar manner, the remaining audio bandpass filters included in array 21A are tuned to the difference frequencies noted in table 1 so as to pass the sound IF signal produced at the output of VIF circuit 15A by respective television broadcast systems.

Switches 20A and 22A are controlled by identifying circuit 25A to select a particular one of these audio bandpass filters for connection between the output of VIF circuit 15A and the input of SIF circuit 23A.

The output of SIF circuit 23A is demodulated and amplified by an amplifier 24A and coupled to a loudspeaker 11 by audio selector switch 10. This selector switch is controlled by CPU 6, as will be described.

A television system automatic identifying circuit 25A is coupled to VIF circuit 15A and to SIF circuit 23A and is adapted to be supplied with the video and sound intermediate frequency signals (the VIF and SIF signals). It is appreciated that these frequencies are established by the particular television broadcast system by which the received television signals are broadcast. It is further recognized that the VIF and SIF signals will exhibit their largest respective magnitudes when the proper video bandpass filter included in array 13A is connected to VIF circuit 15A and when the proper audio bandpass filter included in array 21A is connected to SIF circuit 23A. That is, when those filters which are tuned to the video and sound intermediate frequencies of the particular television broadcast system then being received are selected, the VIF and SIF signal levels will be the largest; and the VIF and SIF circuits supply the video and sound intermediate frequencies to identifying circuit 25A. The identifying circuit senses the difference frequency $f_s - f_p$ and, in one embodiment is provided with a look-up table which stores the various operating characteristics of signal processor 7A as a function of the television broadcast system identified by this difference frequency $f_s - f_p$. Thus, once the television broadcast system used to transmit the television signals then being received over the television channel selected by tuner 5A is identified, the settings of switches 12A and 14A, 16A and 18A, 20A and 22A and the settings of VIF circuit 15A and SIF circuit 13A are read out. Consequently, the desired video bandpass filter, trap filter and audio bandpass filter are selected as a function of the identified television broadcast system, as are the operating characteristics of the VIF and SIF circuits. Hence, once the television broadcast system which is being used to broadcast the television signals then being received over the channel to which tuner 5A is tuned is identified, the operating characteristics of signal processor 7A are established to provide optimum reception of those television signals.

One example of an automatic identifying circuit that may be used as circuit 25A is described in Japanese Laid-Open patent application Ser. No. 63-9373.

It is appreciated that signal processor 7B is of substantially similar construction as signal processor 7A and, moreover, television system automatic identifying circuit 25B is substantially identical to television system identifying circuit 25A. Thus, depending upon the frequency difference $f_s - f_p$ of the television signals then being broadcast over the particular channel to which tuner 5B is tuned, identifying circuit 25B operates to identify the particular television broadcast system by which those television signals are broadcast. Identifying circuit 25B may include a look-up table similar to that included in identifying circuit 25A and, therefore, once the frequency difference $f_s - f_p$ is determined, the television broadcast system used to transmit the television signals of the channel to which tuner 5B is tuned is identified and the operating characteristics of signal processor 7B are established.

CPU 6 is coupled to tuners 5A and 5B and is adapted to establish respective local oscillating frequencies to which the tuners may be tuned. Thus, each tuner may be tuned to the same or different television broadcast frequencies. The CPU also is coupled to selector circuit 8 and to selector switch 10 for selecting which of the demodulated television signals will be supplied to picture tube 9 as the primary and inset pictures and which of the demodulated audio signals will be supplied to loudspeaker 11. Depending upon the user's operation of CPU 6, the primary television picture displayed on picture tube 9 may be derived from the television signals processed by signal processor 7A and the inset picture may be derived from the television signals processed by signal processor 7B. Alternatively, the main picture may be derived from the video output of signal processor 7B while the inset picture may be derived from the video output of signal processor 7A. Likewise, the audio signals supplied to loudspeaker 11 may be produced either by signal processor 7A or by signal processor 7B as selected by the user's operation of CPU 6.

A significant disadvantage attending the television receiving apparatus illustrated in FIGS. 2A and 2B resides in the need for two television system automatic identifying circuits 25A and 25B, one each for signal processors 7A and 7B. The use of such duplicate circuitry adds to the expense and overall size of the apparatus. Furthermore, when CPU 6 is operated to change the channel (or channels) to which tuner 5A or tuner 5B (or both) is tuned, a noticeable delay is produced until identifying circuit 25A or identifying circuit 25B (or both) satisfactorily identifies the television broadcast system by which the television signals are transmitted over the newly tuned channel(s). During this delay, picture tube 9 usually is blanked to prevent the display of an unsatisfactory television picture while the proper bandpass and trap filters are selected and while the VIF and SIF circuits are adjusted.

Thus, if a user operates CPU 6, for example, to change the channel to which tuner 5A is tuned, an undesired and annoying blank picture is present. The user may erroneously perceive the blank picture to be indicative of a malfunction of the receiving apparatus.

Figure 3A:
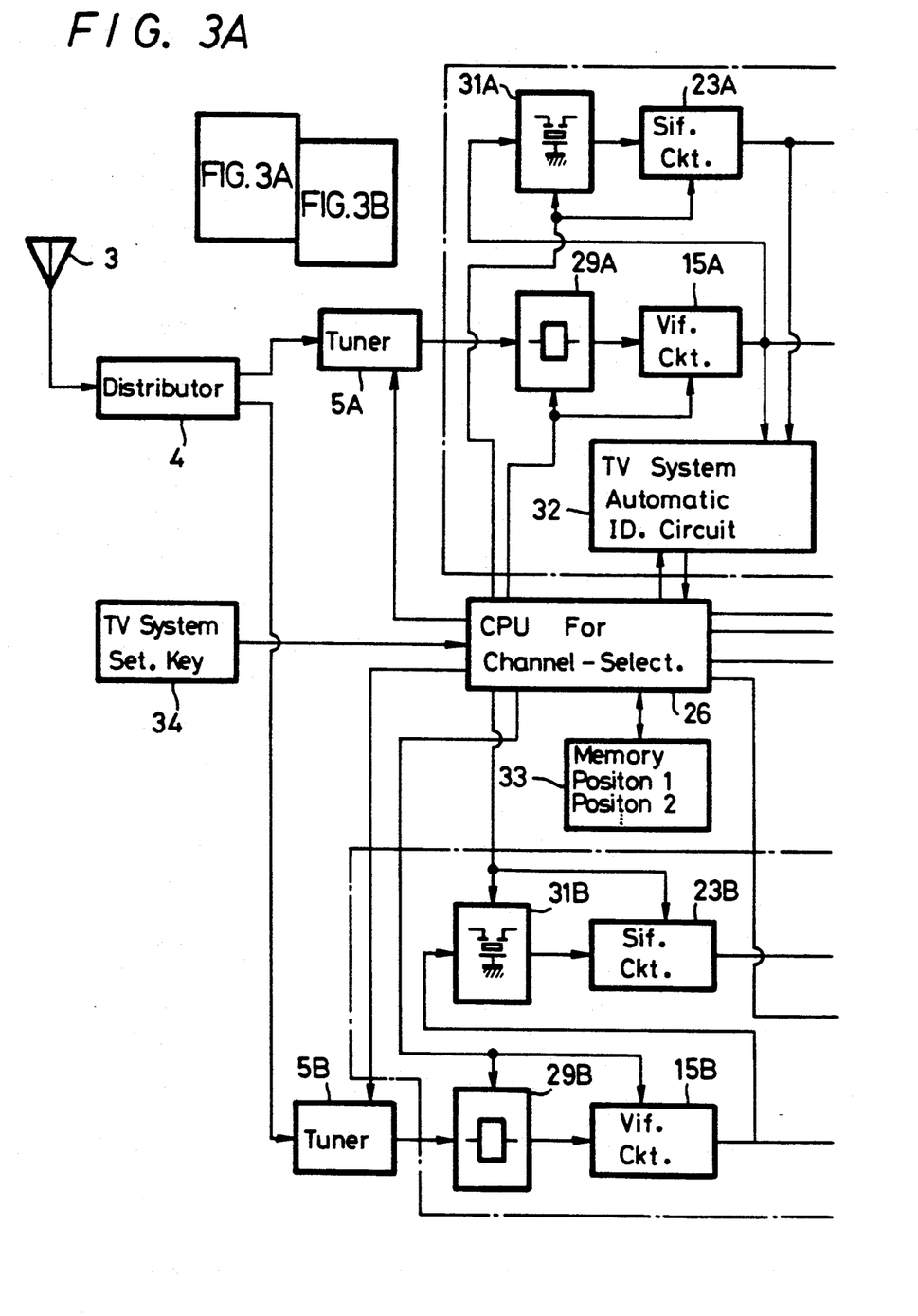
FIGS. 3A and 3B, in combination, comprise a block diagram of a preferred embodiment of the present invention.
Figure 3B:
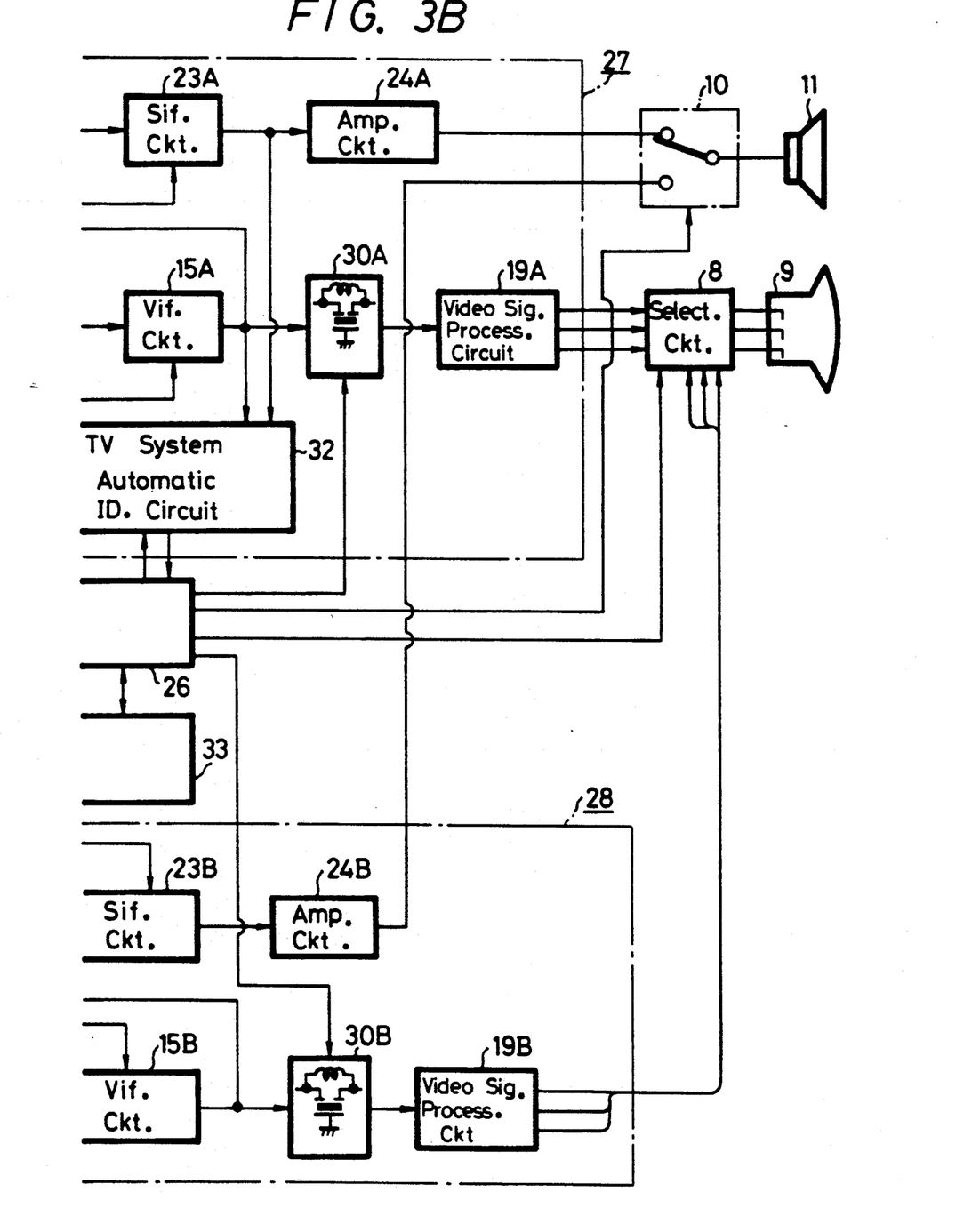

The present invention, one embodiment of which is illustrated in FIGS. 3A and 3B, in which like reference numerals are used to identify those elements which have been described above, overcomes the aforementioned disadvantage found in the television receiving apparatus of FIGS. 2A and 2B. For convenience, FIGS. 3A and 3B illustrate two channels A and B for receiving and demodulating television signals broadcast by two different television broadcast systems. It will be apparent that an additional number of channels may be used to demodulate additional television signals which will provide the simultaneous display of several picture-in-picture programs.

As shown, tuner 5A is coupled to a channel A signal processor 27 which includes VIF circuit 15A, video signal processing circuitry 19A, SIF circuit 23A and audio amplifier 24A. Tuner 5B is coupled to a channel B signal processor 28 which includes VIF circuit 15B, video signal processing circuitry 19B, SIF circuit 23B and audio amplifier 24B. It will be appreciated that, in this regard, signal processors 27 and 28 are substantially similar to each other and the VIF, video signal processing, SIF and audio amplifier circuits are substantially the same as those which have been discussed above in conjunction with FIGS. 2A and 2B. In view of these similarities between signal processors 27 and 28, and in the interest of brevity, only signal processor 27 is described in further detail.

VIF circuit 15A is coupled to tuner 5A by an array of IF bandpass filters 29A which are similar to the aforedescribed combination of array 13A and switching circuits 12A and 14A. IF bandpass filters 29A are coupled to a CPU 26 (to be described), the latter serving to select one of the filters included in array 29A for connecting VIF circuit 15A to the output of tuner 5A. CPU 26 also is coupled to VIF circuit 15A and is adapted to supply to the VIF circuit a control signal for establishing particular operating characteristics thereof compatible with the particular bandpass filter by which the tuner output is coupled to the VIF circuit.

The output of VIF circuit 15A is coupled to a video signal processing circuit 19A by an array 30A of trap filters. The trap filters included in array 30A may be similar to aforedescribed trap filters 17A which are individually connected between VIF circuit 15A and video signal processing circuit 19A by selector switches 16A and 18A in FIGS. 2A and 2B. CPU 26 is coupled to array 30A to supply a control signal thereto by which an individual trap filter is connected between VIF circuit 15A and video signal processing circuit 19A.

The output of the VIF circuit 15A also is coupled to SIF circuit 23A by an array 31A of audio bandpass filters. These audio bandpass filters may be similar to aforedescribed bandpass filters 21A which are individually connected between the VIF and SIF circuits by selector switches 20A and 22A in FIG. 2A. CPU 26 is coupled to array 31A to select and connect a particular audio bandpass filter to the input of SIF circuit 23A. The CPU is also coupled to the SIF circuit to supply a control signal thereto for establishing operating characteristics of the SIF circuit compatible with the particular audio bandpass filter connected thereto.

Channel A signal processor 27 includes a television system automatic identification circuit 32. This circuit is coupled to VIF circuit 15A and SIF circuit 23A to receive the video IF frequency and the sound IF frequency produced by these IF circuits. The identifying circuit preferably includes a look-up table which stores the operating characteristics established by each television broadcast system as indicated in Table 1, with each such system being identified by the difference frequency $f_s - f_p$, wherein $f_s$ is the audio intermediate frequency and $f_p$ is the video intermediate frequency. Thus, identifying circuit 32 serves to identify a television broadcast system as a function of this difference frequency $f_s - f_p$. Identifying circuit 32 is coupled to CPU 2 and supplies to the CPU the television broadcast system identified thereby as well as the operating characteristics of that system.

It will be noted that the television system automatic identifying circuit 32 is included only in the channel A signal processor 27. Channel B signal processor 28 does not include an identifying circuit. As will be described, the television system automatic identifying circuit is used generally only during a set-up mode of operation wherein the television broadcast systems by which television signals are broadcasted and received by the television receiving apparatus are identified. Once such identifications are made, the identifying circuit need not be employed to receive, demodulate and display a broadcasted television program unless the user wishes to make additional or supplemental adjustments to the channels which may be received.

CPU 26 may preferably comprise a suitably programmed microprocessor which is user-actuated as by a channel selector, remote control unit or the like, for supplying selected channel select signals to tuners 5A and 5B by which these tuners are tuned to desired broadcast frequencies. The CPU is coupled to a non-volatile memory 33 adapted to store predetermined broadcast channel indications and identifications of the television broadcast systems associated with those channels. For example, memory 33 may store data representing that channel I is associated with television broadcast system B, channel II is associated with television broadcast system G, channel III is associated with television broadcast system K, channel IV is associated with television broadcast system G, and so on. As will be described, the particular broadcast channel indication which is stored is determined by the user's operation of CPU 26 and the television broadcast system associated therewith is identified by identifying circuit 32 when that channel is being received. The channel indications and television broadcast system identifications are written into memory 33 during the set-up mode, and the stored information is read from the memory during a reception mode, as will be described. It is appreciated that, in addition to storing simply the identification of a television broadcast system, the operating characteristics of signal processor 27 (and, because it is substantially identical thereto, the operating characteristics of signal processor 28) are stored. Hence, when CPU 26 is operated to read from memory 33, the information defined by a user-selected broadcast channel, the operating characteristics of the television broadcast system associated with that channel also are read. These characteristics are used to select individual ones of filters 29A, 30A and 31A in signal processor 27, individual ones of filters 29B, 30B and 31B of signal processor 28, compatible parameters of VIF circuit 15A and SIF circuit 23A and compatible parameters of VIF circuit 15B and SIF circuit 23B. Thus, depending upon the selected broadcast channel, signal processors 27 and 28 are disposed in respective conditions by which the television signals broadcast over those channels are demodulated and displayed.

CPU 26 is used both in a set-up mode, as will be described below, and in an operating mode as aforementioned. Video selector circuit 8 and audio selector switch 10 are controlled by the CPU to select the television signals received over channel A or channel B as the primary picture and inset picture, respectively, and to select the sound signals received over channel A or channel B to drive loudspeaker 11.

CPU 26 also is coupled to a television system setting key 34 which is manually operable by a user to supply to the CPU the identification of a particular television broadcast system selected by the user. For example, if the television signals received over a selected broadcast channel during, for example, the set-up mode, are not readily identifiable by identifying circuit 32 because of radio interference or the like, the user may, nevertheless, supply to CPU 26 an identification of a particular television broadcast system if the user is aware of the television broadcast system which is used by that selected channel. With this identification, the CPU may supply to, for example, signal processor 27, the operating characteristics (e.g., the selected filters and IF operating parameters) of that identified system.

The manner in which the television receiving apparatus illustrated in FIGS. 3A and 3B operates now will be described. First, a set-up mode of operation is discussed. Let it be assumed that N broadcast channels may be selected and that a suitable manually operated device, such as a remote control unit, is operable to select any one of these N channels. Let it be further assumed that the television receiving apparatus is geographically located so as to receive television signals that are broadcasted by different television broadcast systems. Initially, the user actuates the manual device, such as the aforementioned remote control unit, to select an arbitrary switching position thereon. For convenience, let it be assumed that this switching position is position 1. CPU 26 responds to the selection of position 1 to supply to tuner 5A a control signal which tunes the tuner to a first known broadcast channel. For example, the tuner may include a phase-locked loop having a programmable frequency divider; and the CPU establishes the dividing ratio of that programmable divider such that a local oscillating signal of frequency corresponding to the first broadcast channel is selected. Thus, tuner 5A is tuned to the frequency of this first broadcast channel.

During the set-up mode of operation, tuner 5B and signal processor 28 may be ignored. Accordingly, the signals supplied from CPU 26 to tuner 5B are irrelevant.

In one mode of operation of CPU 26, a predetermined filter included in array 29A is selected to connect the output of tuner 5A to VIF circuit 15A. Accordingly, the selected filter filters an IF signal produced by tuner 5A (which now is tuned to the first broadcast frequency) to VIF circuit 15A which supplies an IF signal to identifying circuit 32. If the level of this IF signal exceeds a predetermined threshold, it is concluded that tuner 5A is tuned to an actual broadcast channel. However, if the IF signal level does not exceed this threshold, CPU 26 advances to supply another control signal to tuner 5A whereby the tuner next is tuned to another broadcast frequency. Once again, the IF output of tuner 5A is filtered and supplied to VIF circuit 15A which, in turn, applies an IF signal to identifying circuit 32. As before, the level of this IF signal is compared to the threshold, and, if that IF signal level does not exceed the threshold level, the foregoing process is repeated.

When the level of the IF signal produced by VIF circuit 15A is of sufficient magnitude, that is, if it exceeds the aforementioned threshold, it is determined that tuner 5A is tuned to a broadcast channel over which television signals are being broadcast. Accordingly, CPU 26 stores in memory 33 an indication of the frequency to which the tuner now is tuned. For example, memory 33 stores an indication of channel I at position 1 of the manually operated channel selector.

Next, CPU 26 selects a first audio bandpass filter included in array 31A to connect the output of VIF circuit 15A to SIF circuit 23A. The sound IF signal now produced by SIF circuit 23A is applied to identifying circuit 32A which detects the amplitude of the SIF signal. Then, the next audio bandpass filter included in array 31A is connected to SIF circuit 23A and the level of the SIF signal now produced thereby is detected. The foregoing operation is repeated until SIF signal levels produced as a result of each audio bandpass filter are detected. The audio bandpass filter which produces the SIF signal having the largest amplitude is determined by CPU 26; and that filter is connected between the output of the VIF circuit 15A and the input of SIF circuit 23A.

With the connection of the proper IF bandpass filter 29A and audio bandpass filter 31A, as aforementioned, identifying circuit 32 uses the frequency difference $f_s - f_p$ to identify the television broadcast system by which the television signals received by tuner 5A are transmitted. The identifying circuit supplies CPU 26 with the identification of this television broadcast system.

Once the CPU is provided with this television broadcast system identification, it selects the trap filter included in array 30A by which undesired frequencies, such as the sound IF carrier of an adjacent channel, the sound IF carrier of the present broadcast channel and the video IF carrier of an adjacent channel, are blocked from video signal processing circuit 19A. Moreover, the operating characteristics of VIF circuit 15A and SIF circuit 23A are adjusted by CPU 26 to be compatible with the identified television broadcast system.

CPU 26 controls video selector circuit 8 and audio selector switch 10 so as to display a video picture and produce audible sounds derived from the television signals processed by signal processor 27. Additionally, CPU 26 stores in memory 33 the identification of this television broadcast system which now is associated with the broadcast channel indication that had been stored previously when identifying circuit 32 and CPU 26 determined that television signals were being broadcasted over the particular channel to which tuner 5A is tuned. For example, if identifying circuit 32 identifies the received television signals as being broadcast by television broadcast system L, memory 33 stores for channel selector position 1 an indication that broadcast channel I is broadcasting television signals by television broadcast system L. Of course, the operating parameters associated with television broadcast system L, as noted in Table 1 above, likewise may be stored in memory 33.

The foregoing operations are repeated from channel to channel until, for each relevant selector position of the manually operable channel selector device, an indication of that position, together with an indication of a broadcast channel and an identification of the television broadcast system by which television signals are broadcasted over that channel are stored.

Of course, as tuner 5A is tuned to each broadcast channel, verification that television signals are broadcasted thereover may be made simply by observing the television picture displayed on picture tube 9.

In the foregoing operation, it has been assumed that, during the set-up mode, a predetermined video bandpass filter included in array 29A is selected for each broadcast channel to which tuner 5A is tuned. As an alternative, when CPU 26 supplies a tuning control signal to tuner 5A, for example, when the CPU supplies a dividing ratio to the programmable frequency divider that may be included in the tuner, a first of the video bandpass filters may be selected. Then, the level of the video IF signal produced by VIF circuit 15A is detected, whereafter the next video bandpass filter included in array 29A is selected and the video IF signal level is detected once again. This operation is repeated until all of the video bandpass filters have been selected. Then, the filter which produces the video IF signal with the largest level is selected by CPU 26. If this video IF signal level exceeds a threshold, it is determined that television signals are being broadcasted over the particular broadcast channel to which tuner 5A is tuned. At that time, the CPU stores in memory 33 an indication of this broadcast channel and, more particularly, the frequency to which tuner 5A is tuned. However, if the largest detected IF signal level does not exceed the aforementioned threshold, CPU 26 is advanced to supply to tuner 5A another tuning control signal. The tuner thus is tuned to a different broadcast frequency; and the foregoing operation is repeated.

Once it is determined that tuner 5A is tuned to a broadcast channel over which television signals actually are being broadcasted, and after the video bandpass filter included in array 29A has been selected to produce a maximum video IF signal level, CPU 26 next selects the appropriate bandpass filter included in array 31A. As mentioned above, each audio bandpass filter is selected, one at a time, and the level of the sound IF signal produced by SIF circuit 23A for each such filter is detected. The filter which produces the sound IF signal with the largest level is selected as the proper audio bandpass filter.

Identifying circuit 32 now is supplied with a video IF signal from VIF circuit 15A and a sound IF signal from SIF circuit 23A. The identifying circuit identifies the television broadcast system as a result of the frequency difference $f_s - f_p$. This identification is supplied to CPU 26 and stored in memory 33 whereat it is associated with the stored indication of the channel to which tuner 5A is tuned and the position of the manually operable channel selector device which is used to select this channel. A trap filter included in array 30A is selected by CPU 26 as a function of the identified television broadcast system. Then, the user may operate the aforementioned channel selector device to select another position thereon, whereupon the foregoing operation is repeated.

As a result of the aforedescribed set-up mode of operation, memory 33 stores, for each selected position of the channel selector device, an indication of the broadcast channel over which television signals are being broadcasted and an identification of the television broadcast system by which those television signals are broadcast. Thus, memory 33 may store information of the type illustratively represented in the following Table 2.

TABLE 2

| MEMORY INFORMATION | | |
| --- | --- | --- |
| Channel Selector Postion | Broadcast Channel | Television Broadcast System |
| 1 | I | G |
| 2 | II | L |
| 3 | IV | L |
| 4 | V | K |
| 5 | VII | B |
| 6 | VIII | L |

Once the aforedescribed set-up mode has been completed, the illustrated apparatus may be operated in a viewing mode. For example, and consistent with Table 2, let it be assumed that the user wishes to observe the television program broadcasted over channel IV as the primary picture and the television program broadcasted over channel V as the inset picture. The aforementioned channel selection device thus may be operated by selecting channel position 3 to tune tuner 5A to broadcast channel IV and by selecting channel position 4 to tune tuner 5B to broadcast channel V. Suitable channel command signals may be supplied to CPU 26 by the channel selector device.

In response to these command signals, CPU 26 reads the broadcast channel indication and television broadcast system identification stored at channel selector position 3 and supplies to tuner 5A the channel control signal to tune this tuner to broadcast channel IV. Concurrently, CPU 26 reads from memory 33 the broadcast channel indication stored at channel position 4. Hence, the CPU supplies to tuner 5B the channel control signal to tune tuner 5B to broadcast channel V. The user also may select the picture-in-picture display arrangement which he desires, such as the arrangement shown in FIG. 1A or the arrangement shown in FIG. 1B.

Consistent with the example under discussion, CPU 26 also reads from memory 33 the identification of television broadcast system L stored at channel selector position 3. The operating parameters of television broadcast system L are used by the CPU to select the video bandpass filter from array 29A, the trap filter from array 30A, the audio IF bandpass filter from array 31A, the operating parameters of VIF circuit 15A and the operating parameters of SIF circuit 23A used by television broadcast system L. Thus, optimum filters and operating characteristics for demodulating and displaying the television signals broadcasted over channel IV are established for signal processor 27. The television picture derived from these television signals is displayed as the primary picture.

Similarly, CPU 26 reads from memory 33 the identification of television broadcast system K stored at channel selector position 4. The operating parameters of television broadcast system K are used by the CPU to select the video bandpass filter from array 29B, the trap filter from array 30B, the audio IF filter from array 31B, the operating parameters of VIF circuit 15B and the operating parameters of SIF circuit 23B for optimum demodulation and display of the television signals broadcast by television broadcast system K. The television picture derived from the television signals broadcasted over channel V (the channel to which tuner 5B is tuned) is displayed as the inset picture by picture tube 9. As a result, a primary picture corresponding to broadcast channel IV and an inset picture corresponding to broadcast channel V are displayed in picture-in-picture format by picture tube 9.

It is appreciated that in the viewing mode, the proper setting of signal processors 27 and 28 is not dependent upon the present operation of identifying circuit 32. Rather, since the television broadcast system used by each broadcast channel has been selected heretofore during the set-up mode, CPU 26 acts to establish the proper settings of the signal processors quickly and easily merely by reading out this information from memory 33. Consequently, there is no noticeable delay in displaying television pictures when the tuning conditions of tuners 5A and/or 5B are changed. For example, if the channel selector device is operated such that tuner 5A now is to be tuned to broadcast channel I, CPU 26 merely reads from memory 33 the broadcast channel indication and television broadcast system identification stored at channel selector position 1. Tuner 5A thus is tuned promptly to channel I and signal processor 27 is set to be compatible with the operating parameters of television broadcast system G. The delay heretofore associated with identifying circuit 32 once tuner 5A is changed is obviated. That is, it is not necessary to wait for the identifying circuit 32 to identify the television broadcast system by which television signals are broadcasted over channel I before signal processor 27 is set properly.

Furthermore, it is appreciated that only one identifying circuit 32 is needed to identify the television broadcast systems which are used by the broadcast channels that can be received by the illustrated apparatus. This is because such identification is needed only during the set-up mode, whereupon the particular filters and operating characteristics of the VIF and SIF circuits are selected. Thereafter, when a user wishes to receive a particular broadcast channel over which television signals actually are broadcasted, the selection of that channel results in the reading out of the identity of the television broadcast system used by that channel and, thus, during this viewing operation, the signal processor is properly configured to be compatible with the selected channel.

The function previously performed by identifying circuits 32 during the set-up mode need not be carried out again during the viewing mode. Hence, there is little, if any, delay in displaying a television picture when tuner 5A or tuner 5B is changed over to a new broadcast channel.

While the present invention has been shown and described with reference to a preferred embodiment, it will be readily appreciated by those of ordinary skill in the art that various changes and modifications may be made without departing from the spirit and the scope of the invention. For example, the description of signal processors 27 and 28 is based upon the operation of a television receiving apparatus as an intercarrier sound receiver wherein the video and sound signals are separated after both have passed through the VIF circuit. Nevertheless, it will be appreciated that the present invention is equally applicable to a split carrier sound receiver; and it is understood that the particular frequencies to which the audio and bandpass filters are tuned will, of course, be compatible with such a split carrier system. Furthermore, although only two signal processors 27 and 28 are shown, a larger number of signal processors may be used with additional tuners to display a primary picture and several inset pictures. Nevertheless, even if several signal processors are employed, only a single identifying circuit is needed.

It is intended that the appended claims be interpreted as including the embodiment described herein, those variations and alternatives which have been mentioned above and all equivalents thereto.

What is claimed is:

1. Television receiving apparatus for receiving television signals broadcasted over preselected broadcast channels by different television broadcast systems and including plural demodulator means for concurrently displaying television programs broadcasted by different television broadcast systems, said apparatus comprising: processor means for selecting a broadcast channel to be demodulated by at least one of said demodulator means; detecting means for detecting if television signals are broadcast over the selected broadcast channel and, if so, determining a sound carrier frequency derived from said television signals so as to identify, as a function of the determined sound carrier frequency, the television broadcast system associated with said selected broadcast channel and by which said television signals are broadcast; memory means for writing thereinto and reading out therefrom an indication of the selected broadcast channel and an identity of the television broadcast system associated therewith as determined by said detecting means; means for advancing said processor means to select another broadcast channel whereby an indication of said other broadcast channel and the identity of a television broadcast system associated therewith are written into said memory means, and retrieval means for reading out from said memory means selected broadcast channel indications together with the identities of the television broadcast systems associated therewith and that had been written thereinto; and means for controlling said plural demodulator means in response to the identified television broadcast systems read out from said memory means for concurrently displaying television programs broadcast over said read out broadcast channels.

2. The apparatus of claim 1 wherein each of said demodulator means includes tuner means tunable to a broadcast channel selected by said processor means.

3. The apparatus of claim 2 wherein each of said demodulator means further includes intermediate frequency (IF) means coupled to said tuner means for producing video IF signals from the television signals broadcast over the channel to which said tuner means is tuned; and said detecting means comprises level detecting means for detecting the level of the video IF signals produced by a predetermined demodulator means, whereby the channel to which said tuner means is tuned is detected as a broadcast channel as a function of the video IF signal level.

4. The apparatus of claim 3 wherein each demodulator means further includes sound intermediate frequency (SIF) means included in said IF means for producing sound IF signals from the television signals broadcast over the channel to which said tuner means is tuned; and said detecting means additionally includes means for detecting the level of the IF signals produced by the SIF means included in said predetermined demodulator means, whereby the sound carrier frequency of the television signals broadcast over said channel to which said tuner means is tuned is determined as a function of the sound IF signal level.

5. The apparatus of claim 4 wherein each demodulator means includes plural filter means, each individually connectable between said tuner means and said IF means and each being tuned to a frequency $f_p$ established by a respective television broadcast system; and said detecting means also includes filter select means for selecting one of said plural filter means in said predetermined demodulator means as a function of the selected broadcast channel.

6. The apparatus of claim 5 wherein each demodulator means further includes plural audio bandpass filter means, each individually connectable to said SIF means and each being tuned to a frequency established by a respective television broadcast system; and said detecting means further includes sound filter select means for sequentially connecting said audio bandpass filter means to said SIF means in said predetermined demodulator means and selecting the one audio bandpass filter means which results in the sound IF signal having the largest detected level, and means for identifying the television broadcast system as a function of the frequency to which the selected audio bandpass filter means is tuned.

7. The apparatus of claim 4 wherein each demodulator means includes plural filter means, each individually connectable between said tuner means and said IF means and each being tuned to a frequency $f_p$ established by a respective television broadcast system; and said detecting means further includes filter select means for sequentially connecting said filter means between said tuner means and said IF means in said predetermined demodulator means and selecting the one filter means which results in the video IF signal having the largest detected level.

8. The apparatus of claim 7 wherein each demodulator means further includes plural audio bandpass filter means, each individually connectable to said SIF means and each being tuned to a frequency established by a respective television broadcast system; and said detecting means further includes sound filter select means for sequentially connecting said audio bandpass filter means to said SIF means in said predetermined demodulator means and selecting the one audio bandpass filter means which results in the sound IF signal having the largest detected level, and means for identifying the television broadcast system as a function of the frequency to which the selected audio bandpass filter means is tuned.

9. The apparatus of claim 4 wherein each demodulator means includes: plural filter means each individually connectable between the tuner means and the IF means of said demodulator means and each being tuned to a frequency established by a respective television broadcast system, and plural audio bandpass filter means each individually connectable to the SIF means of said demodulator means and each being tuned to a frequency established by a respective television broadcast system; and wherein said retrieval means includes selecting means for selecting a respective filter means and a respective audio bandpass filter means in each demodulator means in accordance with the television broadcast system identities read from said memory means.

10. The apparatus of claim 9 wherein said selecting means includes manually operable read-out means for reading out from said memory means a respective television broadcast system identity for each demodulator means.

11. The apparatus of claim 1 wherein each demodulator means is operable to receive television signals broadcast by an intercarrier television broadcast system.

12. The apparatus of claim 1 wherein each demodulator means is operable to receive television signals broadcast by a split-carrier television broadcast system.

13. The apparatus of claim 1, further including display means for superimposing a television picture derived from one demodulator means on a television picture derived from another demodulator means.

14. The apparatus of claim 13, further comprising speaker means for producing audible sounds derived from the broadcast channel demodulated by said demodulator means, and means for supplying to said speaker means audio signals recovered from a broadcast channel by a selected one of said demodulator means.

15. Television receiving apparatus for receiving television signals broadcasted over preselected broadcast channels by different television broadcast systems and including plural demodulator means for demodulating video and audio signals from received television signals and for concurrently displaying television programs broadcasted by different television broadcast systems, said apparatus comprising: microprocessor means operative to sequentially selected broadcast channels to be demodulated by at least one of said demodulator means to determine if television signals are being broadcast over each selected channel and, if so, to identify the television broadcast system associated with each channel over which television signals are being broadcast; memory means for storing indications of the respective broadcast channels over which television signals are determined to be broadcast and for storing identities of the television broadcast systems associated with those broadcast channels as determined by said microprocessor means; parameter setting means included in each demodulator means for setting the operating parameters thereof compatible with a selected television broadcast system; and read-out means for reading out from said memory means and supplying to a selected demodulator means a broadcast channel indication and a television broadcast system identity associated with said broadcast channel indication to set the operating parameters of said selected demodulator means such that television signals broadcast over the read out broadcasts channel are demodulated and displayed.

16. Television receiving apparatus for receiving television signals broadcasted over preselected broadcast channels by different television systems, comprising: plural demodulator means each for demodulating video and audio signals from television signals that are broadcasted over respective broadcast channels, each demodulator means including video IF means tunable to different video IF frequencies associated with said different television systems and sound IF means tunable to different sound IF frequencies associated with said different television systems; detecting means for detecting the television system by which received television signals are broadcasted; microprocessor means operable in a set-up mode to selected successive broadcast channels for the reception of television signals broadcast thereover and to tune said video IF means and said sound IF means to respective video and sound IF frequencies associated with the television system that is detected for the selected broadcast channel over which the television signals are received; and memory means for writing thereinto channel indications representing the respective broadcast channels over which television signals are received by said apparatus and system indications representing the respective television systems that are detected for the television signals which are received over the respective broadcast channels; said microprocessor means being operable in a viewing mode to read out from said memory means plural channel and system indications that had been written thereinto during said set-up mode for controlling respective ones of said plural demodulator means to demodulate video and audio signals from television signals broadcasted over said plural channels and for tuning said video and sound IF means in said plural demodulator means to the video and sound IF frequencies associated with the television systems represented by the read out system indications.

17. The apparatus of claim 16 wherein said microprocessor means is operable in said set-up mode to tune the video and sound IF means in a selected one of said demodulator means to successive video and sound IF frequencies when each broadcast channel is selected for the reception of television signals; and said detecting means includes means for sensing maximum video and sound IF signal levels from said video and sound IF means to thereby identify the video and sound IF frequencies of the television signals received over a broadcast channel.

18. The apparatus of claim 17 wherein said detecting means further comprises means for determining the difference between the identified video and sound IF frequencies and for identifying the television system by which said television signals are broadcasted over said broadcast channel as a function of said difference.

19. The apparatus of claim 17 wherein said detecting means additionally comprises signal determining means for determining if television signals are being received over the broadcast channel selected by said microprocessor means.

20. The apparatus of claim 19 wherein said signal determining means comprises threshold means coupled to said video IF means of said one demodulator means for detecting if the video IF signal level exceeds a predetermined threshold level, thereby indicating the reception of television signals.

* * * * *